United States Patent
Cambio, Jr.

[15] 3,667,638
[45] June 6, 1972

[54] LEVER OPENED SEALED CONTAINER
[72] Inventor: Orlando D. Cambio, Jr., Chicago, Ill.
[73] Assignee: Abbott Laboratories, North Chicago, Ill.
[22] Filed: Dec. 11, 1969
[21] Appl. No.: 884,086

[52] U.S. Cl. ................................215/32, 215/1 C, 220/27
[51] Int. Cl. ..........................................B65d 1/02
[58] Field of Search..............................215/32, 1 C; 220/27

[56] References Cited

UNITED STATES PATENTS

| 3,083,858 | 4/1963 | Biedenstein | 215/32 X |
| 3,159,697 | 12/1964 | Tocci | 215/1 C UX |
| 3,120,679 | 2/1964 | Price | 215/1 C UX |
| 3,473,685 | 10/1969 | Karlan | 215/42 X |
| 3,356,244 | 12/1967 | Witchell | 215/32 |
| 2,323,080 | 6/1943 | Anderson | 215/46 R |
| 2,937,778 | 5/1960 | Wall | 215/46 R |
| 2,046,173 | 6/1936 | Lenhoff | 215/46 R |

Primary Examiner—Donald F. Norton
Attorney—Robert L. Niblack

[57] ABSTRACT

In containers having an integrally molded cap and sealing web, an integral handle, preferably on the mold parting line and extending from the cap, enables cap removal with low force. A fulcrum, within or without the container, cooperates with the handle to open the container.

1 Claim, 13 Drawing Figures

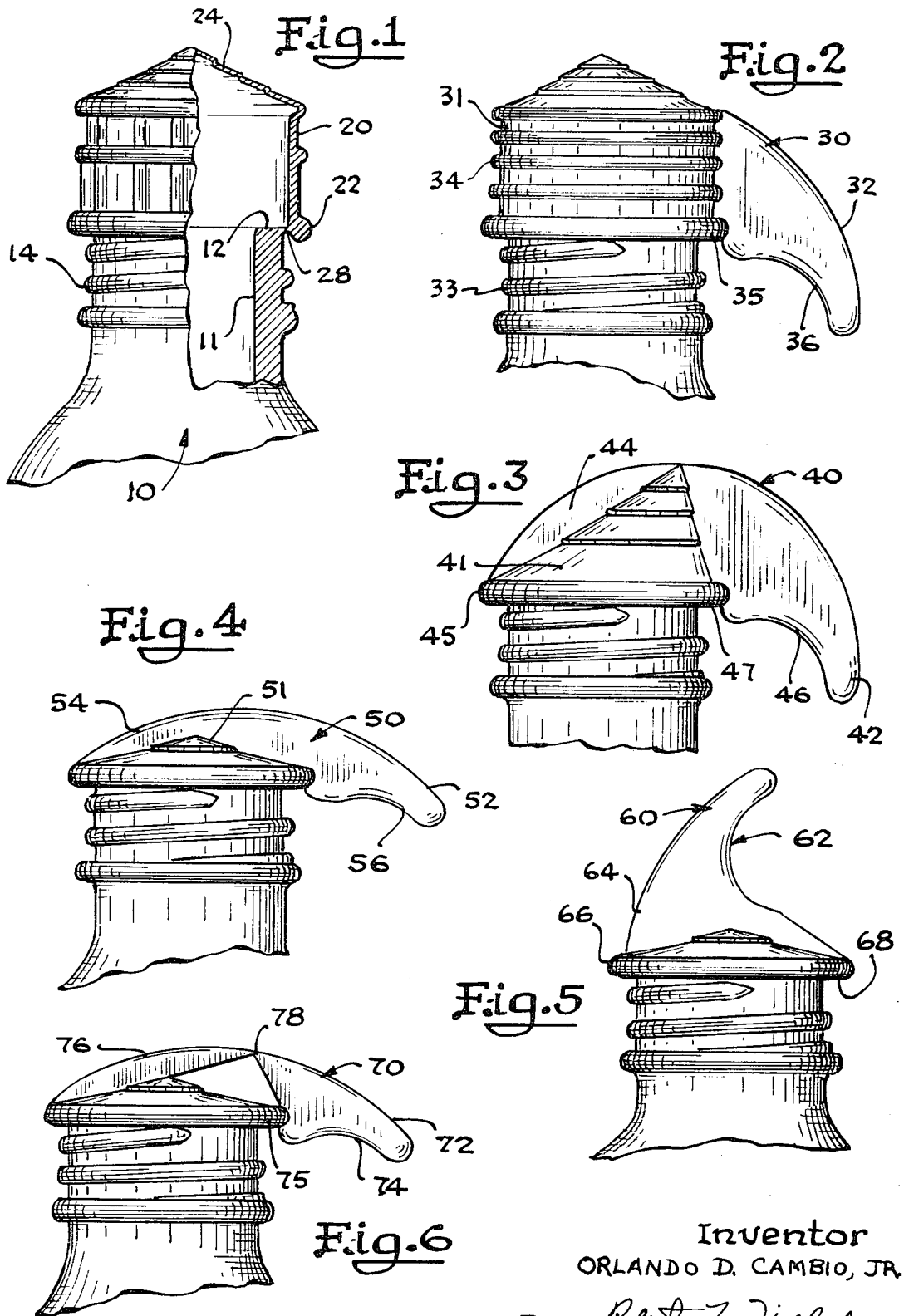

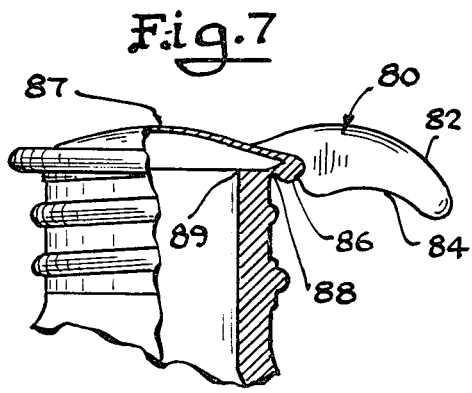
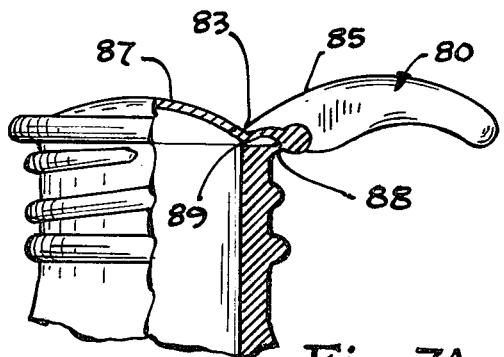
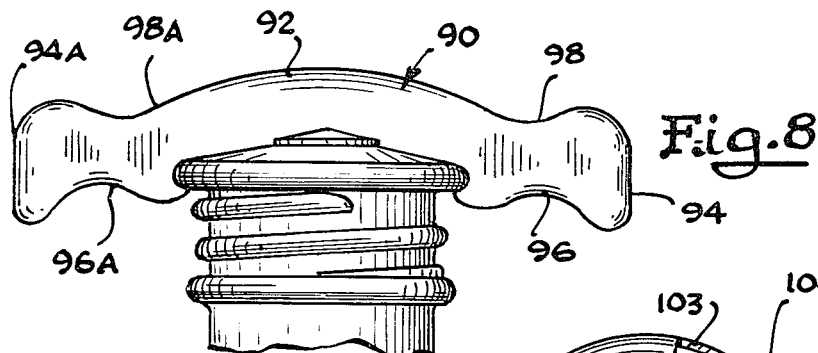
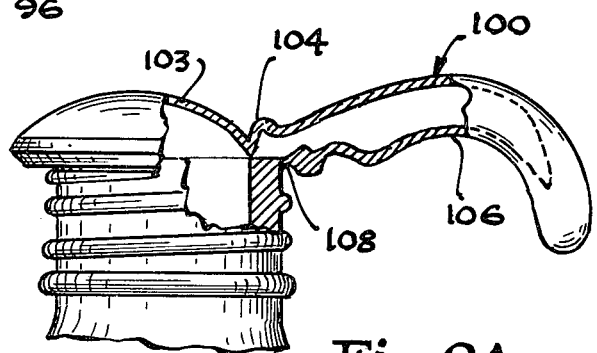
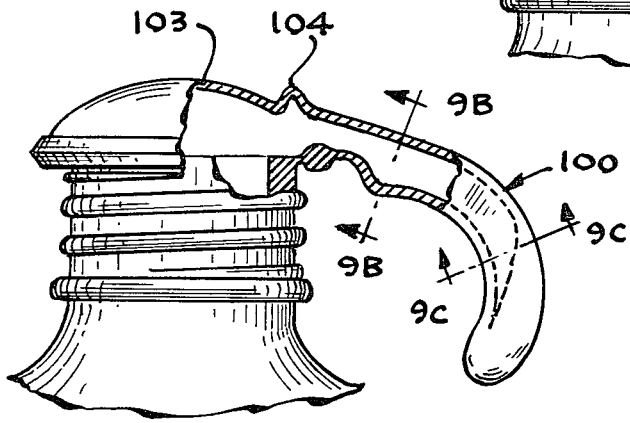
Inventor
ORLANDO D. CAMBIO, JR.
By Robert L. Nielack
Attorney

LEVER OPENED SEALED CONTAINER

BACKGROUND OF THE INVENTION

This invention relates to an improved method of opening sealed bottles, containers and the like which have the cap and container joined by an integrally molded web which is ruptured upon opening. The invention is particularly useful for those containers having a fairly large neck opening adopted to be resealed by supplementary apparatus for withdrawing liquids from or injecting them into said containers. More particularly, this invention is useful with those containers molded of polyethylene or polypropylene and having a bottle neck with diameter of about one inch and in which the lip of the neck, the rim of the cap and the connecting web are nearly coplanar, the web being a few thousandths of an inch in thickness.

Bottles of this type are readily produced by blow molding in which process heated plastic material is positioned between two halves of a mold and the mold halves are brought together. Compressed air injected into the mold forces the plastic to contact the mold walls and to assume their contours. The mold halves at there juncture produce a raised surface characteristic or parting line which usually is visable when the mold is opened to remove the finished bottle. Generally, the parting line lies in a plane which intersects the longitudinal axis of the bottle.

Containers molded of polymers having a tensile strength of from about 2,000 to about 5,000 psi require a torque of between 35 and about 75 inch pounds to remove the integral cap by twisting about the longitudinal axis of the container and cap. A rotational torque of this magnitude is far in excess of that which a large percentage of the population can exert. 10 to 15 inch pounds is considered an acceptable torque and complaints become numerous when the required torque exceeds 20 inch pounds. A reduction of web thickness to reduce the rotational force required to open the container results in an unacceptably large percentage of containers which leak at the web.

It is the initial fracturing of the web which is difficult; once a break has been started, little force is required to propagate it around the periphery of the container neck.

A container with an integrally molded top of the type shown in FIG. 1 of the drawings may be opened by striking the cap a sharp blow downward with a tool or the palm of the hand. This technique is awkward and it requires practice to open a filled container without splashing the bottle contents. Moreover, the impact tends to fragment the web, creating particulate matter, which contaminates the packaged product. Such a procedure is not desirable for a package for medical solutions.

THE INVENTION

It is an object of this invention to provide a structure which will enable an improved technique for opening of sealed containers by application of a force within the range developed by a large segment of the population.

It is a further object of this invention to provide a cap structure in which the opening means is integrally molded with the container closure.

It is still a further object of this invention to provide a lever opening means for a blow molded container. Another object of this invention is provision of lever opening means located on, or substantially parallel with and adjacent to the mold parting line.

These objects and others which will appear from the following description and drawings are achieved through the provision of a lever molded integrally with the closure cap. The lever extends radially or axially from the cap so that a person opening the container can comfortably apply a greater force than is possible when a twisting torque is employed to open a sealed container. The objects are further achieved through the application of this greater force through structure which produces a radical tensile stress or a longitudinal shear stress in the sealing web as opposed to the circumferential shear stress produced by application of a rotational effort to open the container. The desired application of the force is assisted by strengthing means in the cap and extending from the lever toward the longitudinal axis of the cap.

Referring to the drawings,

FIG. 1, a reference figure, is partly in section and shows the interior structure of a molded container closure without the opening means of this invention;

FIG. 2 shows an embodiment of this invention wherein the cap has a large volume and a lever is molded integrally therewith and extends radially along one side thereof;

FIG. 3 shows an alternate embodiment in which the cap has reduced volume and

FIG. 4 shows a preferred embodiment in which the cap has a minimum volume.

FIG. 5 illustrates a container wherein the opening lever extends axially rather than radially from the top of the cap;

FIG. 6 illustrates an opening lever having a fulcrum supported above the surface of the cap;

FIG. 7, partly in section, illustrates an embodiment where the opening lever utilizes an element within the container as a fulcrum;

FIG. 7A illustrates the structure of FIG. 7 wherein the lever is moved to a position just prior to opening the container;

FIG. 8 illustrates a lever suitable for push-pull opening of the container;

FIG. 9 illustrates an embodiment wherein an internal element of the container is employed as the fulcrum and FIG. 9A illustrates the structure of FIG. 9 just prior to opening the container.

FIGS. 9B and 9C are sectional views taken on the lines indicated in FIG. 9.

Referring to FIG. 1, there is illustrated a container indicated generally at 10 having an internal lip 12 and external threads 14 on a neck 11. The lip and threads are provided to accept a resealing closure, the lip being of sufficient width so that the seal is easily accomplished. If it is desired only to reclose the container but not reseal it, the lip may be made narrower and the threads eliminated.

Molded integrally with the container is a cap 20 having a rim 22 surrounding the lip 12. A top 24 surmounts the cap. Joining the lip 12 and the rim 22 is a web 28 which is ruptured to open the container.

When a container of this type is molded from a polyethylene-polypropylene copolymer having a tensile strength of 4,400 psi and the web thickness is 0.003 inch, the rotational torque required to open the container is in the order of 75 inch pounds. This is far in excess of the 10 to 15 inch pounds normally deemed to be a desirable opening torque.

The closure of FIG. 2 is similar to that shown in FIG. 1 but is improved by the addition of a lever 30 having a handle 32 extending radially from the cap 31. This may be conveniently located on or adjacent to the longitudinal mold parting line. A grip 36 is provided for convenient application of force. When the grip 36 is moved in a direction away from the container neck, the web 35 is placed under local tensile and shear stress and fails progressively around its circumference, thus severing the cap 31 from the container neck 33. Circumferential ribs 34 strengthen the walls of the cap and prevent its collapse when force is applied to the grip 36.

In FIG. 3, there is illustrated an alternate embodiment of the invention in which a cap 41 has a reduced volume. The opening lever 40 is provided with a radially extending handle 42 having a finger grip 46 at its lower surface. A single rib 44 extends across the top of the cap and may intersect the rim 45 of the cap diametrically opposite the lever 40. When force is applied to the grip 46 to move handle 42 away from the neck of the container, the web 47 is placed in tension and in shear and fails progressively around its circumference. Rib 44 prevents collapse of the cap. Moreover, the intersection of the rib and rim 45 acts as a fulcrum about which the lever revolves as the container is opened.

FIG. 4, illustrates a preferred embodiment of the invention wherein the cap 51 has a minimum volume and consequently requires a minimum quantity of material for its fabrication. A lever 50 has a handle portion 52 extending radially from the container and is provided with a grip 56 on its lower surface. The lever also includes rib 54 which extends over the top of the cap and intersects the rim 55 diametrically opposite the grip 56. Opening occurs in a manner similar to that described for the embodiments of FIGS. 2 and 3, the intersection of the rim and rib acting as a fulcrum outside of the bottle.

A container was fabricated having its structure arranged as illustrated in FIG. 4, from a polyethylene-polypropylene copolymer having a tensile strength of 4,400 psi. When an opening force was applied at a distance of 1.125 inch from the center line of the container and at a loading rate of 20 inches per minute, the cap was removed with an application of a force of 18 to 25 pounds. When the grip had a width of 0.075 inches, it was determined that the maximum force which might comfortably be developed was 53 pounds and that a force of 25 pounds was easily applied. Increasing the width of the grip on the lever facilitates the development of larger forces. Thus, the container was opened with a force well within the magnitude of that which could be comfortably exerted.

It was noted when using a tensile testing machine for applying the opening force that the loading rate of 20 inches per minute was probably too low; at higher loading rates less force was required to open the containers indicating that with a jerk very little force is required to rupture the web.

In the embodiment shown in FIG. 5, the lever 60 extends axially from the top of the cap 61 and comprises a grip 62 and a rib 64 which extends to the rim 66 about which it tends to rotate when the lever is operated to remove the cap. In opening the container, the force applied to the grip is transmitted to the web 68, in much the same manner as discussed previously.

In the embodiment of FIG. 6, the lever 70 comprises a handle 72 having a grip 74 and a rib 76. The rib and lever are joined at a fulcrum 78 formed by a section of the lever of greatly reduced cross-section. Upon application of a lifting force to the grip 74, the lever 70 pivots on the fulcrum 78 to cause the sealing web 75 to fail due to radial tensile stress. Note that in this embodiment the fulcrum 78 is located outside of the container.

Referring to FIG. 7, which is partly in section, there is illustrated an embodiment with a lever 80 having a handle 82 and a grip 84. The lever is molded integrally with the rim 86 and the top 87. Also shown in this view are the web 88 and the container lip 89.

When, as shown, in FIG. 7A, the lever 80 is raised from the at rest position illustrated in FIG. 7, the rim 86 rotates and the top 87 deforms to enable the lip 89 to support the tip 83 of the rib 85 creating a fulcrum so that the opening force is amplified and the web 88 is caused to fail so that the top may be removed. In this embodiment, the fulcrum is located within the sealed volume itself.

In the embodiment of FIG. 8, the lever 90 is substantially symmetrical and comprises a rib 92 extending over the top 91 of the container, terminating in handles 94 and 94A with grips 96 and 96A. The handles also have reverse grips 98 and 98A so that as a lifting force is applied on the grip 96, downward pressure may be applied on the reverse grip 98A on the opposite side of the container, thus augmenting the force available for opening.

The embodiment of FIG. 9 is similar to that of FIG. 7 except that lever 100 is hollow as shown by cross-sections 101 and 102 in FIG. 9B and 9C. Where the lever is secured to the top 103 there is a stiffening ridge 104. When opening force is applied to the grip 106 and the lever 100 raised, the top 103 is deformed as shown in FIG. 9A until the bottom of the stiffening ridge 104 contacts the container lip 106 to form a fulcrum so that the web 108 is severed by the stress developed. As in the embodiment of FIG. 7, the fulcrum is within the container.

Without further elaboration, it is believed one skilled in the art, from the preceeding specification and drawing, can use this invention to its fullest extent.

I claim:

1. In a sealed container with a mold parting line intersecting the longitudinal axis of the container, a neck including a lip, a cap molded integrally with said container and surmounting said neck, a web joining said lip to said cap and molded integrally therewith, an opening lever integral with said cap, said lever having a handle portion extending from said cap along said parting line, and strengthening means extending from the handle portion toward the longitudinal axis of said cap, said strengthening means comprising a rib, said rib adapted to contact the lip when the opening lever is operated to remove the cap from said container.

* * * * *